(12) United States Patent
Ohnemus (10) Patent No.: US 7,430,935 B2
(45) Date of Patent: Oct. 7, 2008

(54) MOTOR VEHICLE GEARBOX WITH SIX FORWARD GEARS FOR NORMAL DRIVING, AND WITH A CRAWLING GEAR OR HILL GEAR AND A REVERSE GEAR

(75) Inventor: Ulrich Ohnemus, Hattenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/937,895

(22) Filed: Nov. 9, 2007

(65) Prior Publication Data
US 2008/0053258 A1    Mar. 6, 2008

Related U.S. Application Data

(63) Continuation of application No. PCT/EP2006/003069, filed on Apr. 5, 2006.

(30) Foreign Application Priority Data
May 11, 2005   (DE) ................. 10 2005 021 674

(51) Int. Cl.
*F16H 3/08*   (2006.01)
*F16H 59/00*   (2006.01)

(52) U.S. Cl. .......................... 74/329; 74/335
(58) Field of Classification Search .................. 74/325, 74/329, 335
See application file for complete search history.

(56) References Cited

U.S. PATENT DOCUMENTS 3,600,963 A   8/1971 Portmann
4,267,741 A   5/1981 Jarl et al.

(Continued)

FOREIGN PATENT DOCUMENTS

DE   923 402   12/1956

(Continued)

OTHER PUBLICATIONS

Looman et al., "Zahnradgetriebe: Grundlagen und Konstruktion der Vorgelege- und Planetenradgetriebe", 1970, Zahnradgetriebe, Grundlagen und Konstruktion der Vorgelege- und Planetenradgetriebe, Konstruktionsbucher, Berlin, Springer, DE, pp. 174-177, 184, XP-002084463.

(Continued)

*Primary Examiner*—Roger Pang
(74) *Attorney, Agent, or Firm*—Crowell & Moring LLP (57) ABSTRACT

A vehicle transmission having seven forward gears and one reverse gear is described. A first forward gear is a crawling and/or hill gear having a large transmission ratio for low driving speeds, and the other forward gears are intended for normal driving. The transmission includes an input shaft, an output shaft arranged coaxially to the input shaft, an auxiliary shaft arranged parallel to the input shaft and to the output shaft, seven gearwheel stages disposed in gear set planes offset coaxially from each other. In a specified forward gear, intended for normal driving, the torque is transmitted from one gearwheel of one of the gearwheel stages to the other gearwheel of the gearwheel stage. When the crawling and/or hill gear is engaged, the torque is transmitted in the opposite direction from that in the specified forward gear over the corresponding gearwheel stage.

12 Claims, 7 Drawing Sheets

U.S. PATENT DOCUMENTS

| | | | | |
|---|---|---|---|---|
| 5,280,731 | A * | 1/1994 | Turpin | 74/358 |
| 7,069,799 | B2 * | 7/2006 | Wafzig | 74/329 |
| 7,278,950 | B2 * | 10/2007 | Steen et al. | 475/303 |
| 2002/0157491 | A1 * | 10/2002 | Fukuda | 74/335 |
| 2003/0036452 | A1 | 2/2003 | Fuhrer et al. | |

FOREIGN PATENT DOCUMENTS

| | | |
|---|---|---|
| DE | 28 22 617 A1 | 11/1979 |
| DE | 36 14 752 A1 | 11/1986 |
| DE | 42 26 576 A1 | 2/1994 |
| DE | 44 47 214 A1 | 7/1996 |
| DE | 100 25 684 A1 | 11/2001 |
| DE | 101 14 557 A1 | 9/2002 |
| DE | 101 36 231 A1 | 2/2003 |
| DE | 101 43 994 A1 | 3/2003 |
| DE | 103 10 472 A1 | 10/2003 |
| EP | 0 231 069 A1 | 8/1987 |
| EP | 1 279 862 A2 | 1/2003 |
| GB | 2 103 317 A | 2/1983 |
| JP | 55-107150 | 8/1980 |

OTHER PUBLICATIONS

International Search Report dated Jun. 30, 2006 including English translation of pertinent portion (Six (6) pages).
German Search Report dated Oct. 17, 2006 including English translation of pertinent portion (Nine (9) pages).

* cited by examiner

MOTOR VEHICLE GEARBOX WITH SIX FORWARD GEARS FOR NORMAL DRIVING, AND WITH A CRAWLING GEAR OR HILL GEAR AND A REVERSE GEAR

CROSS REFERENCE TO RELATED APPLICATIONS

This application is a continuation of PCT International Application No. PCT/EP2006/003069, filed Apr. 5, 2006, which claims priority under 35 U.S.C. §119 to German Patent Application No. 10 2005 021 674.9 filed May 11, 2005, the entire disclosures of which are herein expressly incorporated by reference.

BACKGROUND AND SUMMARY OF THE INVENTION

The present invention relates to a vehicle transmission having seven forward gears and one reverse gear, the first forward gear being a crawling gear.

Modern manual shift transmissions for vehicles often exhibit six forward gears and a reverse gear. The first forward gear is usually designed to be relatively short. That is, it exhibits a large transmission ratio. The first gear has to be designed in such a manner that it is possible to accelerate with a full load from a full stop under all customary driving conditions, in particular on steep slopes. Therefore, the maximum speed that can be reached in first gear is relatively low. Consequently one has to shift relatively early into second gear. In most vehicles with manual shift transmissions, one has to shift into third gear already at a speed of less than 100 km/h. From the viewpoint of minimizing consumption, a longer first gear and in the maximum speed range at least one overdrive gear may be preferred.

A longer "normal starting gear" may be advantageous from a consumption viewpoint. However, a long first gear presents a problem when accelerating under full load from a complete stop, for example, on a hill.

The embodiments of the invention provide a transmission that enables a reliable start in all customary driving situations and that offers consumption-related advantages over conventional transmissions. In addition, the transmission exhibits a very compact construction.

According to exemplary embodiments of the invention, the vehicle's "normal driving mode" may be represented by six "normal" forward gears. The term "normal driving mode" is defined here as comprising all driving conditions, in particular all start conditions, except for starting on steep slopes and/or on slopes when the vehicle is heavily loaded. For relatively rare driving situations, where acceleration from a full stop occurs on a hill having a steep slope or on a slope when the vehicle is heavily loaded, a crawling and/or hill gear is provided, which may, for example, use a very short gear ratio.

The exemplary embodiments of the invention are used to integrate a crawling and/or hill gear into a conventional six gear shift transmission without increasing the structural dimensions of the transmission, in particular without having to have an additional gear set plane. An exemplary transmission, according to the invention, may include an input shaft as well as an output shaft, arranged coaxially to the input shaft, and an auxiliary shaft, which is arranged parallel to the input shaft and to the output shaft. In conformity with the six gear manual shift transmission that is currently being manufactured, for example by BMW AG, of Munich, Germany, the transmission includes seven gear set planes. Each of the gear set planes is formed by a gearwheel stage, which includes a first gearwheel and a second gearwheel that meshes with the first gearwheel. Each gearwheel stage includes a gearwheel, which is connected in a rotationally fixed manner to its assigned shaft, and a gearwheel, which is rotationally mounted on its assigned shaft and is rotationally coupled to the assigned shaft by using an assigned shifting element.

According to the invention, one of the exemplary gearwheel stages is "used twice." The term "dual use" is defined to mean that in a forward gear, intended for normal driving, the torque is transmitted from the first gearwheel of the exemplary gearwheel stage to the second gearwheel of the gearwheel stage. When the crawling and/or hill gear is engaged, the torque is transmitted in the opposite direction, i.e., from the "second gearwheel" to the "first gearwheel." Thus, according to the invention, it is possible to expand a conventional six gear shift transmission to include a crawling and/or hill gear without having to have an additional gear set plane.

Other objects, advantages and novel features of the present invention will become apparent from the following detailed description of the invention when considered in conjunction with the accompanying drawings.

BRIEF DESCRIPTION OF THE DRAWINGS

Exemplary embodiments of the invention are explained in detail below in conjunction with the drawings.

DETAILED DESCRIPTION OF THE DRAWINGS

Figure 1:
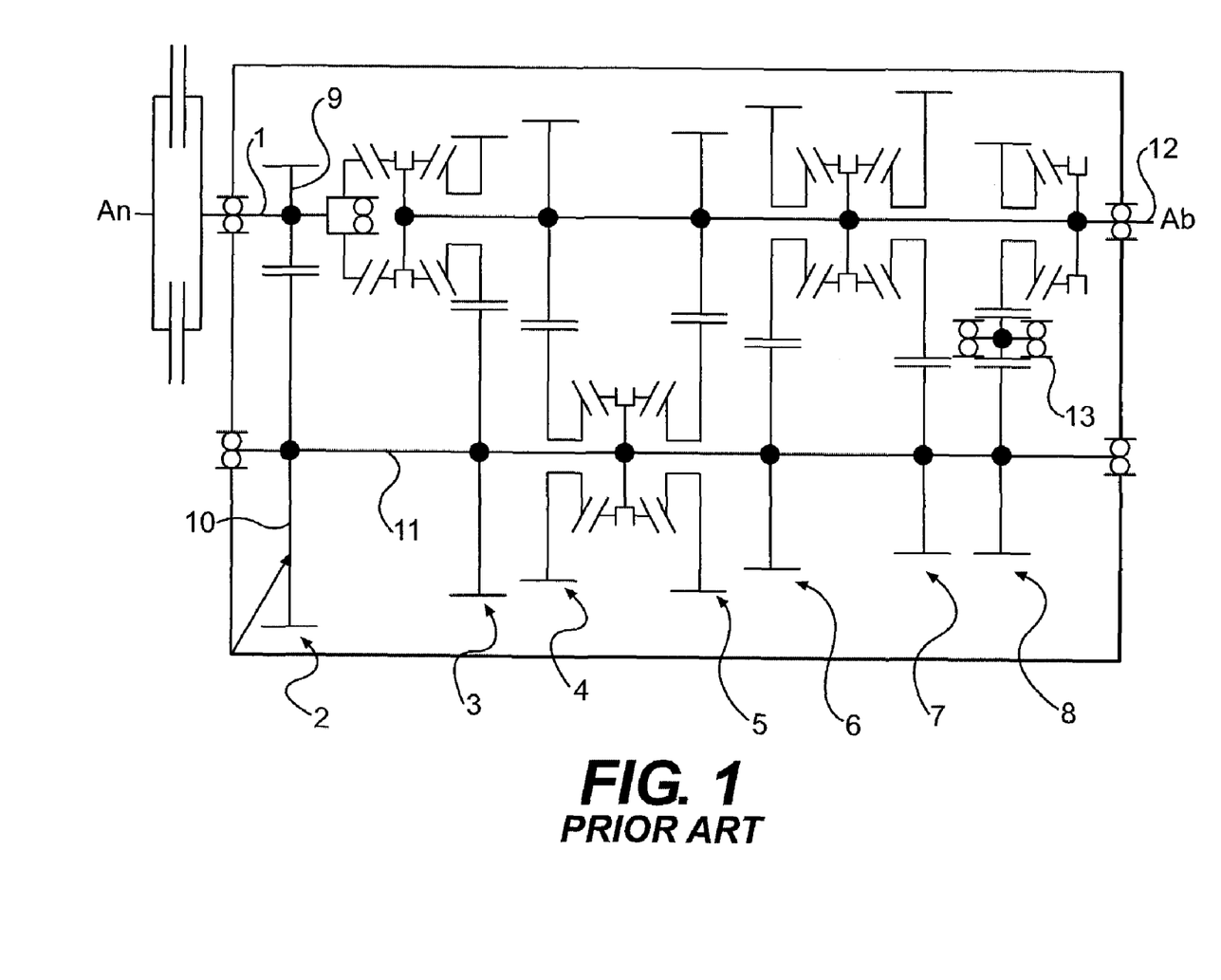
FIG. 1 depicts a six gear manual shift transmission, according to the state of the art.

FIG. 1 depicts a six gear manual shift transmission, of the type that is currently mass produced, for example by BMW. The transmission is constructed in a countershaft mode. It exhibits an input shaft 1 and seven gear set planes, which are formed by the gearwheel stages 2 to 8. The gearwheel stage 2 is a so-called "countershaft constant." It comprises a gearwheel 9, which is connected in a rotationally fixed manner to the input shaft 1, and a gearwheel 10, which is connected in a rotationally fixed manner to a countershaft 11. The two gearwheels 9, 10 are permanently engaged. The gearwheel stages 3 to 8 comprise a gearwheel, which is mounted on the countershaft 11, and a gearwheel, which is mounted on an output shaft 12. Contrary to the gearwheel stage 2, the gearwheel stages 3 to 8 can be shifted. By using of a "third gearwheel" 13 a reverse gear can be illustrated via the gearwheel stage 8.

In the "countershaft concept", the shiftable gearwheel stages 3 to 8 are arranged, when seen in the direction of the force flow, behind the countershaft constant. The input speed of the input shaft 1 is reduced by the countershaft constant 2, a state that results in relatively large torques being transmitted by way of the shiftable gearwheel stages 3 to 8.

Figure 2:
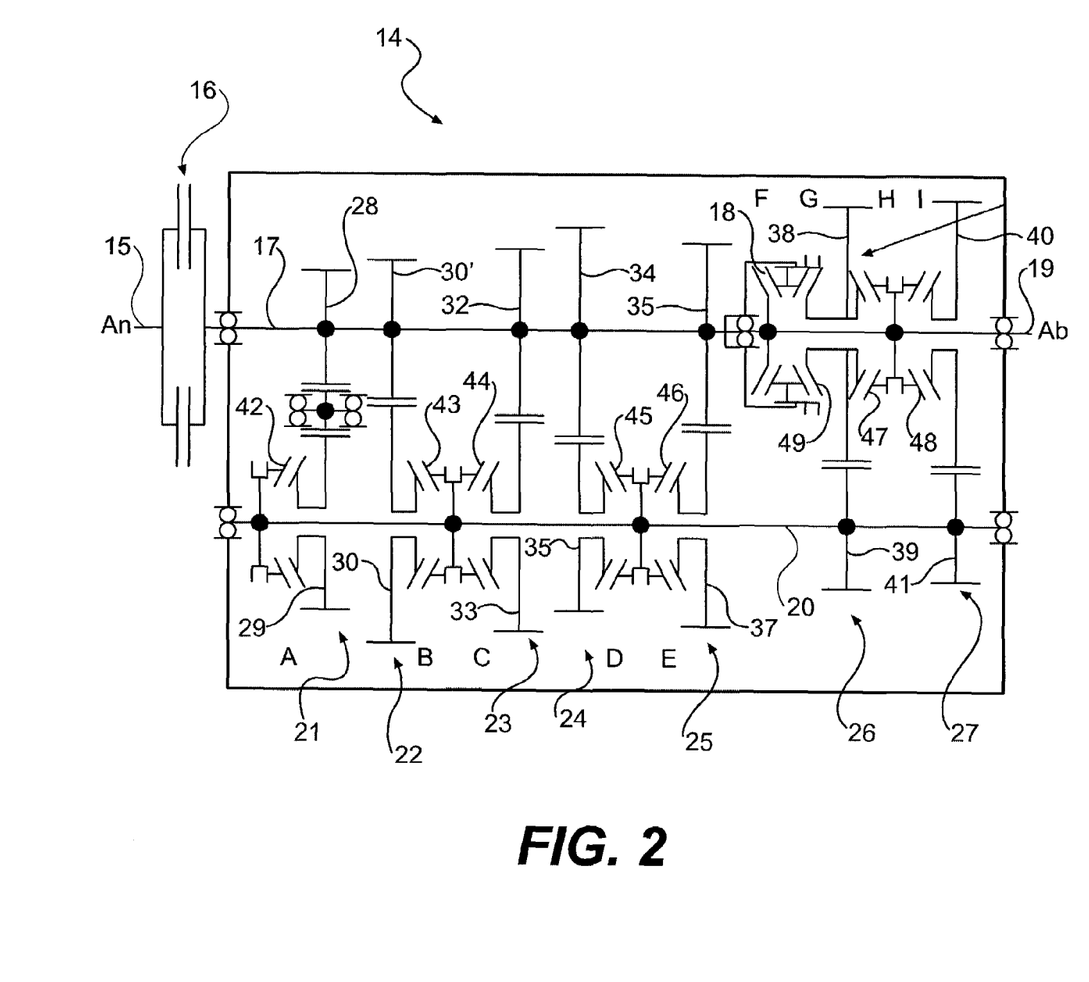
FIG. 2 depicts a transmission, according to an embodiment of the invention.

FIG. 2 depicts an exemplary transmission 14, according to an embodiment of the invention. The transmission 14 exhibits altogether seven forward gears and one reverse gear, thus one forward gear more than the transmission depicted in FIG. 1. Of the seven forward gears, one forward gear is hereinafter referred to as the "0th forward gear." The 0th forward gear is a crawling and/or hill gear. It is intended for driving at an extremely slow speed and/or for accelerating from a full stop on a steep slope or on a slope when the vehicle is heavily loaded. For example, the 0th forward gear may provide a gear ratio that is sufficiently low or short, in view of the vehicle's mass and of the external conditions, to generate a torque at the wheels sufficient to begin movement of the vehicle while in the described conditions. The first forward gear is intended for normal starting gears, as in the case of a conventional transmission. Therefore, the forward gears—one to six—cover all of the driving situations, occurring in the normal mode starting from acceleration from a full stop up to maximum speed, as well as one or two overdrive gears.

From a functional viewpoint, one difference between the exemplary transmission 14, depicted in FIG. 2, and the transmission, depicted in FIG. 1, lies in the longer design of the forward gears 1 to 6. In particular, the exemplary first forward gear according to the invention can be designed to be longer, since it does not have to be designed for all conceivable start conditions, but rather only for the start conditions occurring in normal driving modes, and not for starting on a steep slope and/or with the vehicle under a heavy load. To this end, there is the exemplary "0th gear", which is, for example, shorter than the 1$^{st}$ gear. The longer design of the individual driving gears enables a wide transmission ratio range and, thus, an overdrive gear, which decreases consumption on an even larger scale than the 6th gear of conventional transmissions. The highest gear can be designed to be, for example, the "2nd overdrive gear," i.e., the extreme overdrive gear.

As an alternative, it is envisioned to provide gears 1 to 6 in a manner analogous to a 6 gear transmission, and the 0th gear as the "crawler gear" for all terrain vehicles, providing the greatest torque to the wheels.

The structural design of the exemplary transmission 14 is explained in detail below. The crankshaft 15 of a vehicle engine (not illustrated in detail here) drives a transmission input shaft 17 via a starting clutch 16. The transmission input shaft 17 can be rotationally coupled to an output shaft 19 via a direct shifting element 18, which can be, for example, a sliding sleeve. When the sliding sleeve 18 is closed, the drive shaft 17 and the output shaft 19 rotate at one and the same speed. In parallel to the two coaxially arranged shafts 17, 19 there is a countershaft 20.

According to an exemplary embodiment of the transmission, shown in FIG. 1, the transmission 14 exhibits seven gear set planes 21 to 27, which may each be formed by a gearwheel stage.

The first gear set plane is formed by a gearwheel 28, which is connected in a rotationally fixed manner to the transmission input shaft 17, and a gearwheel 29, which is rotationally mounted on the countershaft 20. The second gear set plane is formed by a gearwheel 30, which is mounted in a rotationally fixed manner on the transmission input shaft 17, and a gearwheel 31, which is rotationally mounted on the countershaft 20. The gear set plane 23 is formed by a gearwheel 32, which is connected in a rotationally fixed manner to the transmission input shaft 17, and a gearwheel 33, which is rotationally mounted on the countershaft 20. Correspondingly the gear set planes 24, 25 are formed by a gearwheel 34 and/or 36, which is mounted in a rotationally fixed manner on the transmission input shaft 17, and an assigned gearwheel 35-37, which is rotationally mounted on the countershaft 20.

The exemplary gearwheel stages 26, 27 are formed by a gearwheel 38 and/or 40, which is rotationally mounted on the output shaft 19, and a gearwheel 39 and/or 41, which is connected in a rotationally fixed manner to the countershaft. The gearwheels 29, 30, 33, 35 and 37 can be rotationally coupled to the countershaft 20 by using assigned sliding sleeves 42-46. The gearwheels 38 and 40 can be rotationally coupled with the output shaft 19 by using assigned sliding sleeves 47 and/or 48.

The torque flow in the individual gears for an exemplary embodiment of the invention is explained in conjunction with the FIGS. 3-10.

Figure 3:
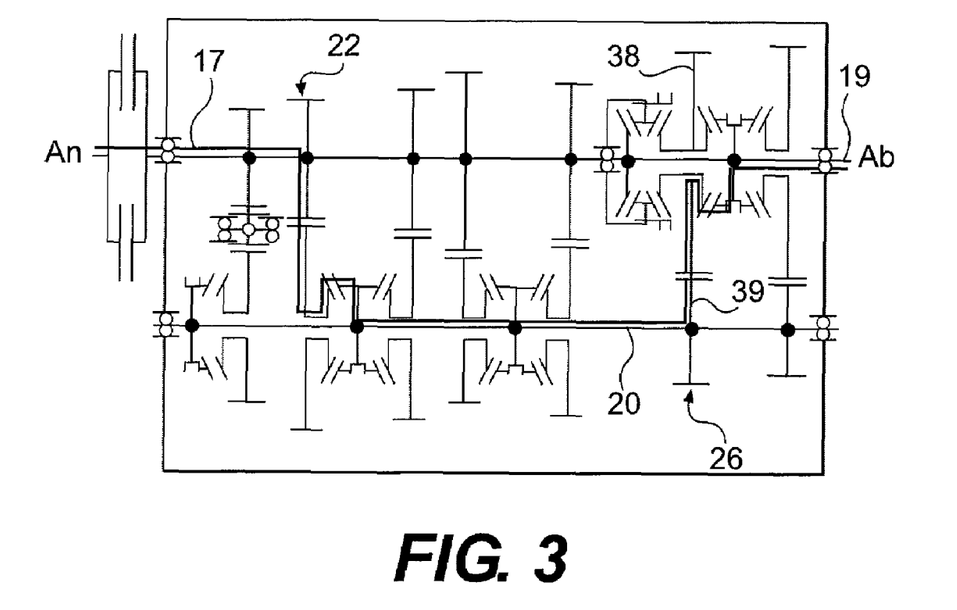
FIGS. 3 to 10 depict the individual gear stages of the transmission shown in FIG. 2.
Figure 4:
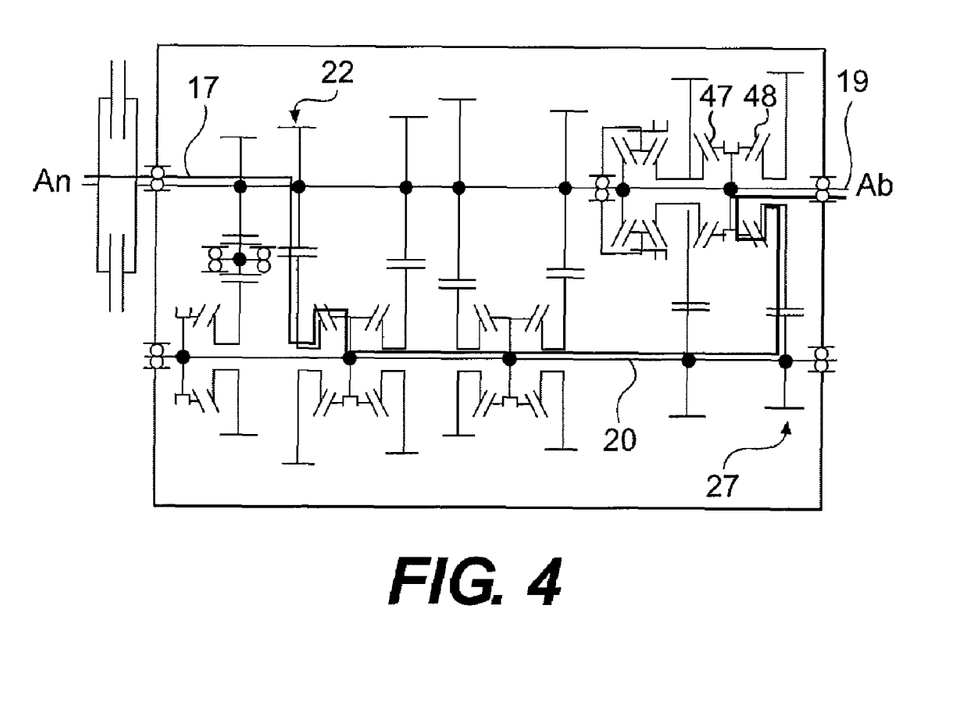

FIG. 3 shows the torque flow in an engaged crawling and/or hill gear. The torque is transmitted from the transmission input shaft 17 over the gearwheel stage of the gear set plane 22 to the countershaft 20 and from there over the gearwheel stage of the gear set plane 26 to the output shaft 19.

If one shifts from the crawling and/or hill gear into the normal start gear, i.e., into first gear, leaving the shift position "0" causes the shifting element 43 to disengage first.

Then by passing over the neutral position, the shifting element 47 is disengaged; and the shifting element 48 is engaged. If now the first gear is selected, the shifting element 43 is re-engaged so that the result is the force flow, shown in FIG. 4.

Figure 5:
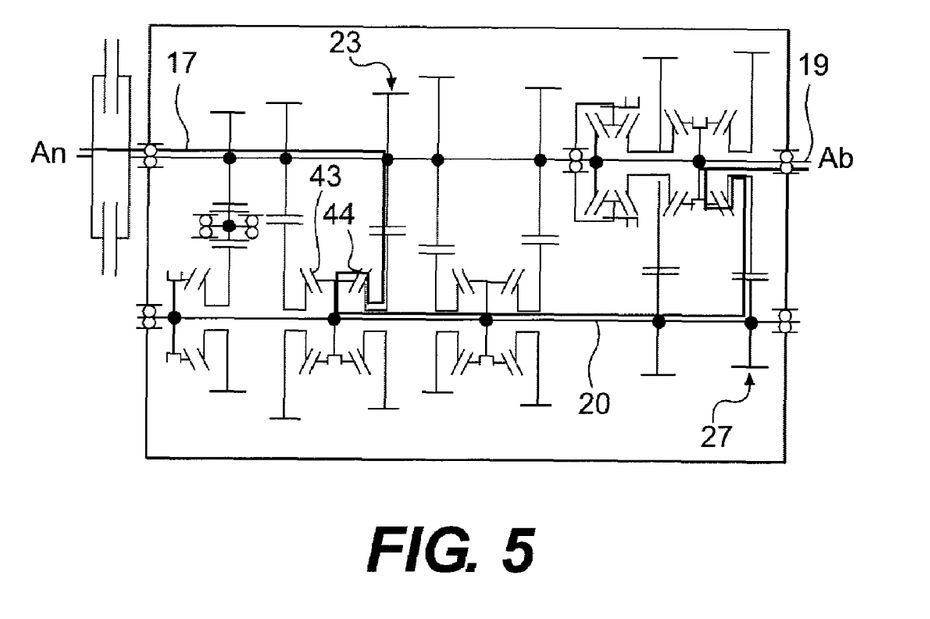

In the transition from first to second gear, the sliding sleeve 43/44 is shifted. In second gear the torque is transmitted from the transmission input shaft 17 over the gear set plane 23 to the countershaft 20 and from there over the gear set plane 27 to the output shaft 19.

Figure 6:
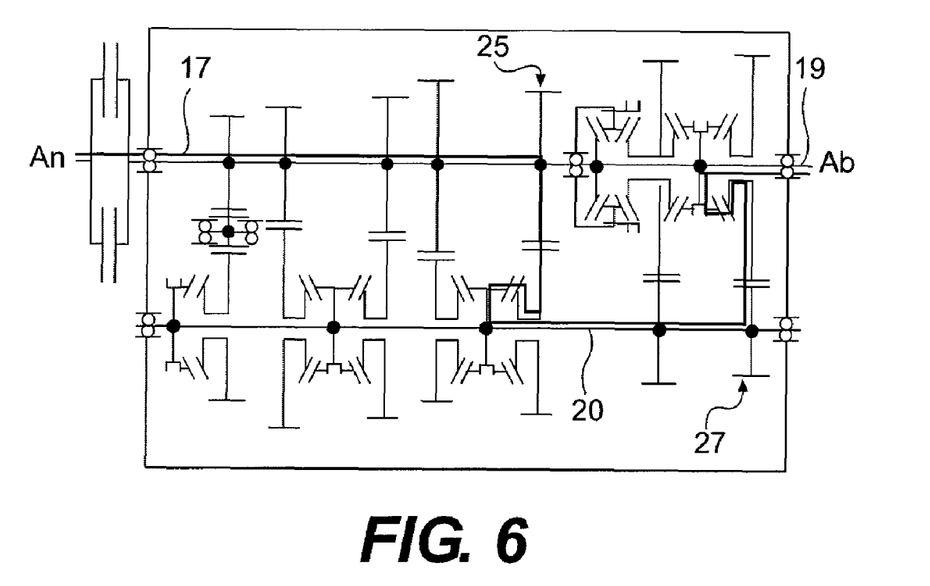

In third gear the torque is transmitted from the transmission input shaft 17 over the gear set plane 25 to the countershaft 20 and from there over the gear set plane 27 to the output shaft 19.

Figure 7:
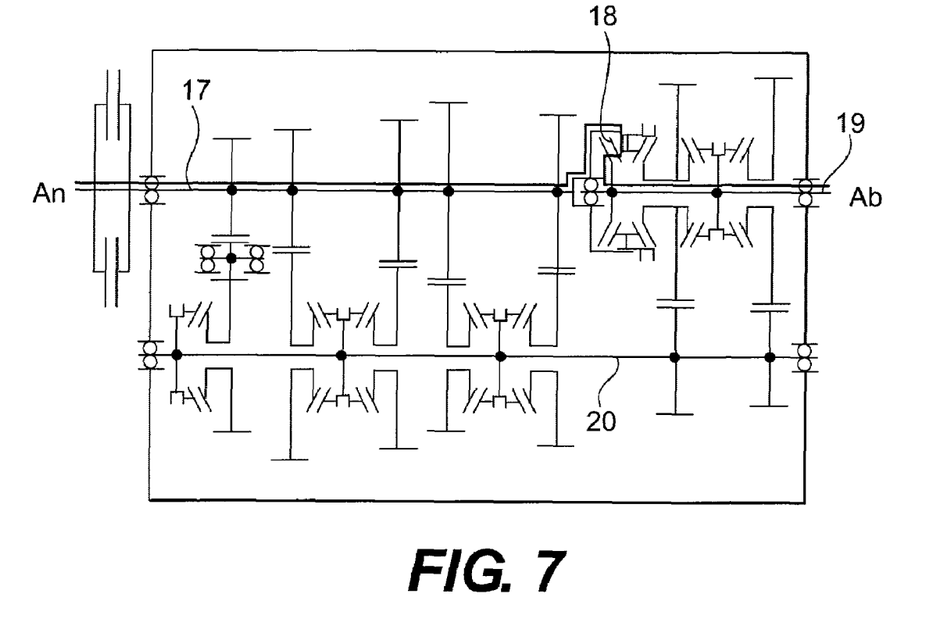

The fourth gear is a "direct drive." In fourth gear the torque is transmitted from the transmission input shaft 17 over the direct drive shifting element 18 directly to the output shaft 19.

The allocation of the gears 4 and 5 can also be reversed. That is, the fifth gear can be a direct drive.

Figure 8:
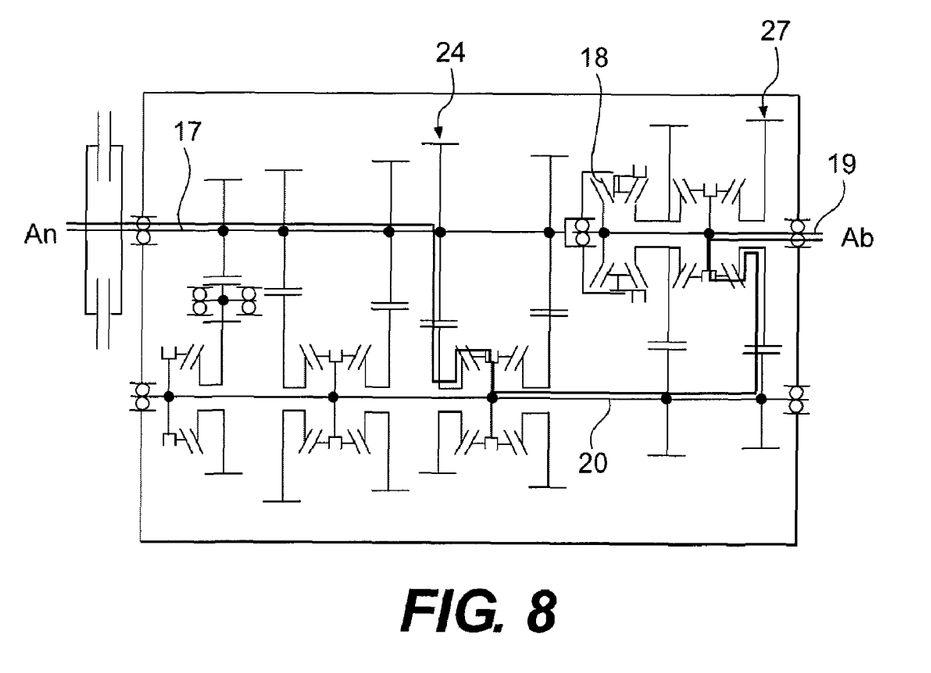

In fifth gear the torque is transmitted from the transmission input shaft 17 over the gear set plane 24 to the countershaft 20 and from there over the gear set plane 27 to the output shaft 19.

Figure 9:
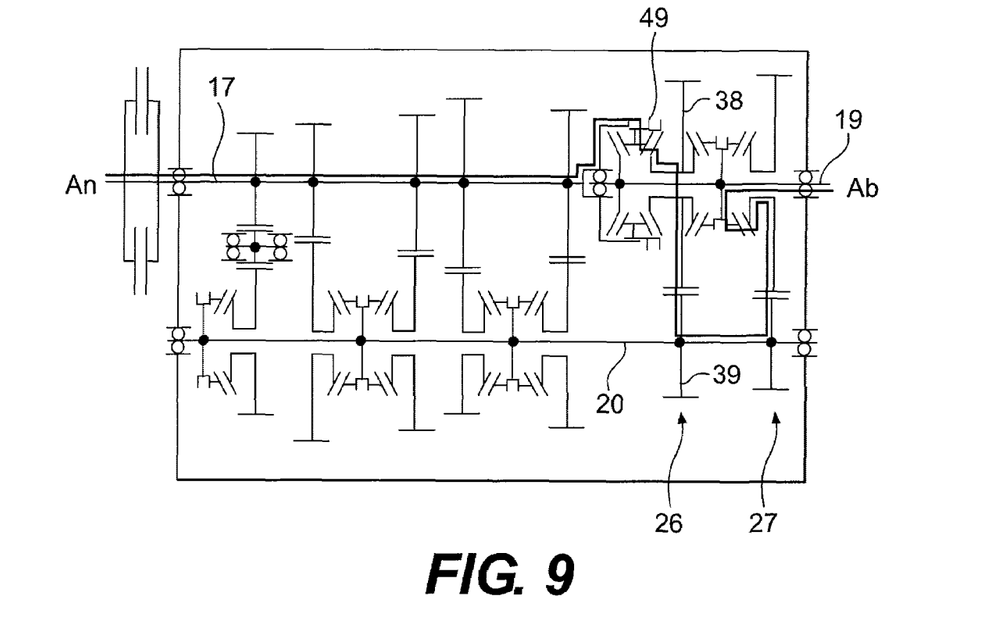

In sixth gear the torque is transmitted from the transmission input shaft 17 over a sliding sleeve 49 to the gearwheel 38 of the gear set plane 26. The torque, which is transmitted to the countershaft 20 via the gear set plane 26, is passed on to the output shaft 19 via the gear set planes 27.

Figure 10:
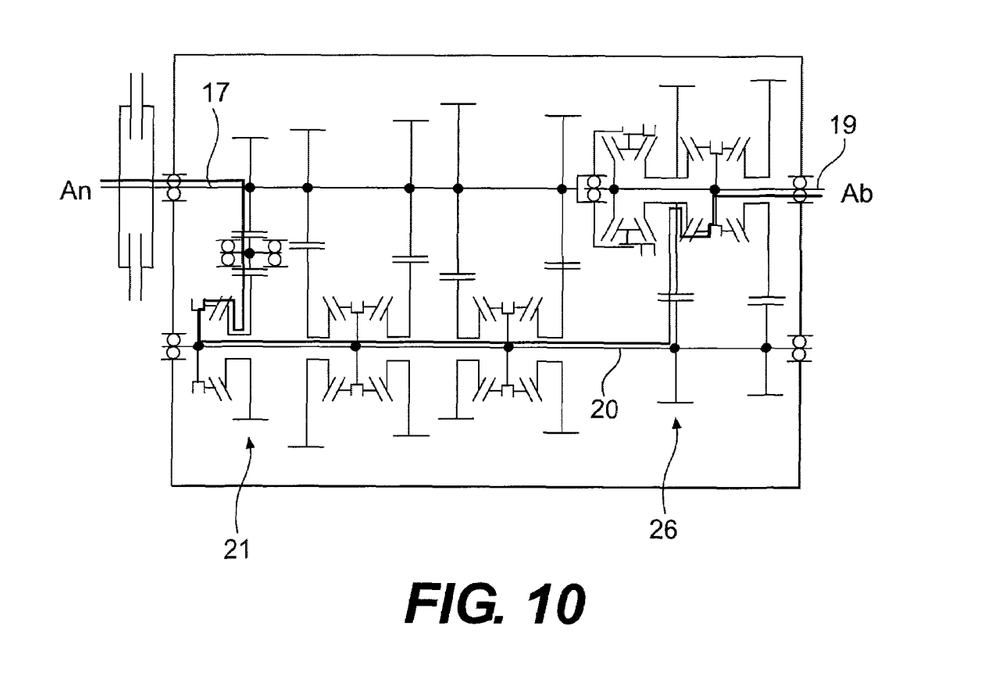

For the sake of completeness, FIG. 10 also shows the reverse gear. When the reverse gear is engaged, the torque is transmitted from the transmission input shaft 17 over the gear set plane 21, which exhibits a "third gearwheel" and/or a "reverse gear gearwheel," to the countershaft 20 and from there over the gearwheel stage 26 to the output shaft 19.

If one compares the torque flow in the 0th gear (FIG. 3) and in the sixth gear (FIG. 9), it can be seen that in both exemplary gears the torque is transmitted over the gear set plane 26. While in the 0th gear the torque is transmitted from the gearwheel 39, which is connected in a rotationally fixed manner to the countershaft 20, to the gearwheel 38, which is rotationally mounted on the output shaft 19, the torque flow in the sixth gear runs in the opposite direction over the gearwheel stage 26. In sixth gear the torque is transmitted from the gearwheel 38 over the gearwheel 39 to the countershaft 20. Owing to this "double occupancy" of one gearwheel stage and/or a gear set plane, a conventional six gear transmission can be expanded to include a crawling and/or hill gear without having to have an additional gear set plane. Therefore, the forward gears 1 to 6, which are intended for normal driving, can be designed to be longer and, thus, save more fuel. The ultra short ratio crawling and/or hill gear, which is called here the 0th gear, is intended for extreme driving situations, like starting on an extremely steep slope, starting on a slope when the vehicle is very heavily loaded, or negotiating very rough terrain.

In order to actuate the shifting elements and/or the sliding sleeves according to embodiments of the invention, that are shown in FIGS. 2-10, various types of actuators, such as electrically operated actuators, can be provided. The actuators may be controlled, for example, by the central transmission electronics, or electronic control unit of the transmission. The driver's request may be entered with an actuating element, disposed in the passenger compartment of the vehicle, for example, a shift lever, joystick or the like, which is operatively connected to the central transmission electronics.

Figure 11:
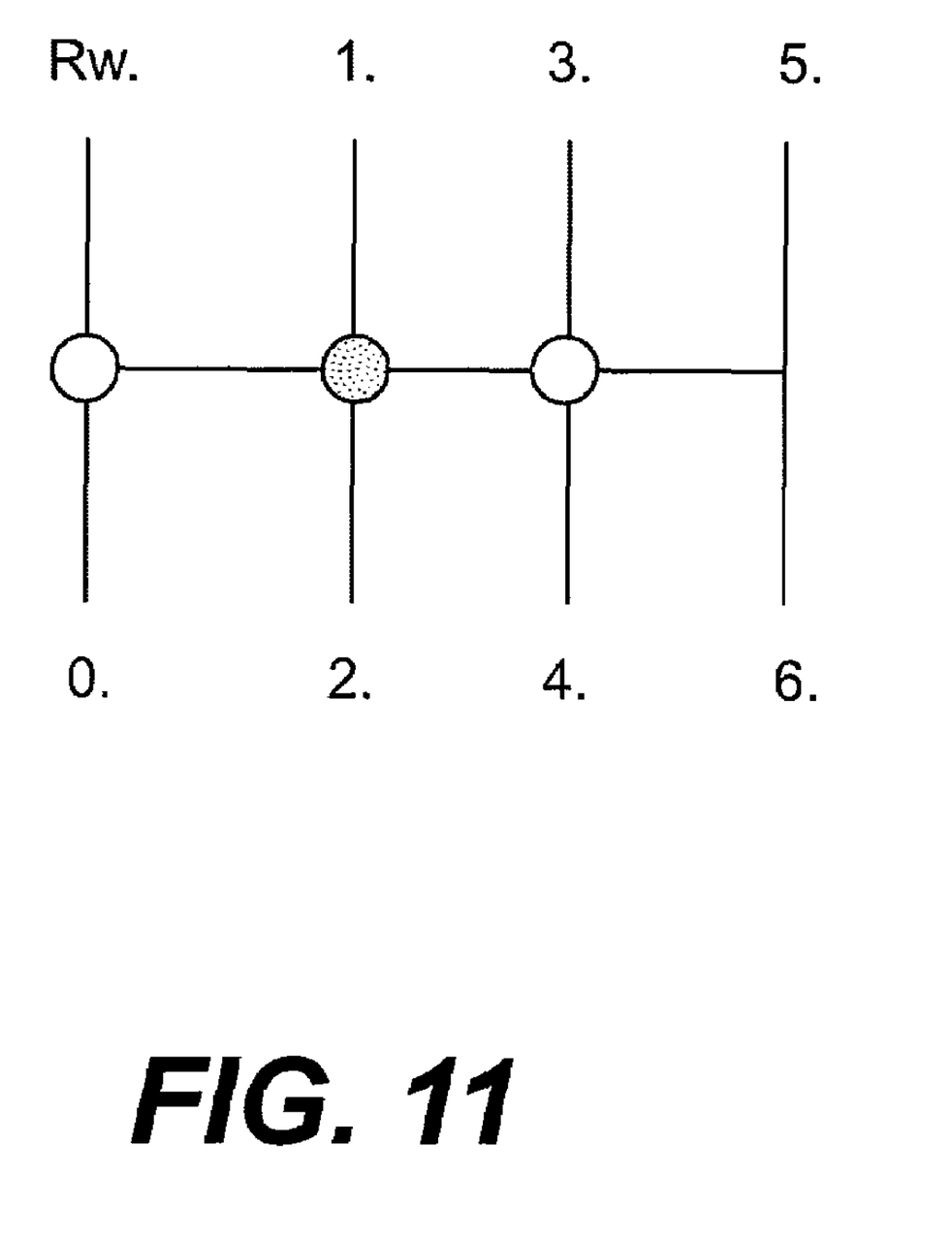
FIG. 11 is a block diagram for a transmission, according to an embodiment of the invention.

As FIGS. 2-10 show, the gear changes 1-2, 3-4, 5-6 are not necessarily carried out by way of the dual shifting element. In a mechanical coupling between the actuating element (shift lever in the vehicle) and the shifting element, this may become a problem, since an expensive shifting mechanisms would be necessary. However, if the shifting elements and/or the sliding sleeves are engaged by using electrically controlled actuators, or other actuators controlled by the electronic control unit, then a "classic H gear shift pattern" as shown in FIG. 11 can be implemented. This exemplary shift pattern has four shifting paths that are arranged next to each other. The left shifting path includes the reverse gear at the left front and the crawling and/or hill gear at the left rear. The adjacent shifting paths correspond to those of the conventional six gear shift transmission. That is, each pair of gears 1-2, 3-4, 5-6 is located in the respective shifting path. In one example, the shifting element manipulated by the driver communicates the desired gear to the electronic control unit, which selects the desired gear by operating the actuators.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle transmission having seven forward gears and one reverse gear, a first forward gear being a crawling and/or hill gear having a large transmission ratio for low driving speeds, comprising:
   an input shaft;
   an output shaft arranged collinearly with the input shaft;
   a counter shaft arranged parallel to the input shaft and to the output shaft;
   seven gearwheel stages disposed in gear set planes which are offset collinearly from each other, wherein each of the gear set planes comprises a first gearwheel and a second gearwheel that meshes with said first gearwheel, each gearwheel stage of the vehicle transmission being formed by a gearwheel connected in a rotationally fixed manner to an assigned one of the input and countershaft, and another gearwheel rotationally mounted on an assigned one of the output shaft and counter shaft, the another gearwheel being couplable with the assigned one of the output and counter shaft by using an assigned shifting element; and
   in a specified forward gear for normal driving, torque being transmitted from a first gearwheel of a corresponding specified gearwheel stage to a second gearwheel of the specified gearwheel stage, wherein, when the crawling and/or hill gear is engaged, torque is transmitted in an opposite direction from that in the specified forward gear over the corresponding specified gearwheel stage, from the second gearwheel to the first gearwheel of the specified gearwheel stage.

2. Vehicle transmission as claimed in claim 1, wherein, when the crawling and/or hill gear is engaged, torque is transmitted from the input shaft over a first gearwheel stage to the counter shaft, and from the counter shaft over a second gearwheel stage to the output shaft.

3. Vehicle transmission as claimed in claim 1, further comprising a direct drive shifting element for rotationally coupling together the input shaft and the output shaft.

4. Vehicle transmission as claimed in claim 2, wherein, in one of the forward gears, torque is transmitted from the input shaft over the second gearwheel stage to the counter shaft, and from the counter shaft over a third gearwheel stage to the output shaft.

5. Vehicle transmission as claimed in claim 1, further comprising electrically actuated actuators for operating the individual switching elements.

6. Vehicle transmission as claimed in claim 5, further comprising a driver operable actuating element, connected electrically to central transmission electronics, the central transmission electronics actuating the actuators according to a desired shifting position, specified by the driver operable actuating element.

7. A vehicle gearbox, comprising:
   an input shaft;
   an output shaft collinear with the input shaft;
   a counter shaft parallel to the input and output shafts;
   a selected number of gearwheel stages disposed in gear set planes offset from each other, each of the gearwheel stages comprising a first gearwheel mounted on the counter shaft, and a second gearwheel, meshing with the first gearwheel, mounted on one of the input and output shaft; and
   a shifting element for rotationally coupling selected ones of the first and second gearwheels to corresponding ones of the output and counter shafts, wherein
   in a specified normal driving forward gear, torque is transmitted from a first to a second gearwheel of a specified gearwheel stage, and in a specified crawling/hill forward gear, torque is transmitted from the second to the first gearwheel of the specified gearwheel stage to provide an additional forward gear over the selected number of gearwheel stages.

8. The vehicle gearbox according to claim 7, further comprising six gearwheel stages providing seven forward gears.

9. The vehicle gearbox according to claim 7, wherein the shifting element comprises an electric actuator.

10. The vehicle gearbox according to claim 7, further comprising a transmission electronic control unit to operate the shifting element.

11. The vehicle gearbox according to claim 10, further comprising a driver operable actuating element operatively connected to the transmission electronic control unit, for selecting a desired gear.

12. The vehicle gearbox according to claim 7, wherein the additional forward gear has a shorter gear ratio than gears selectable in normal driving.

* * * * *